United States Patent
Grosskopf et al.

(10) Patent No.: US 10,718,418 B2
(45) Date of Patent: Jul. 21, 2020

(54) INTEGRATED DRIVE GENERATOR HAVING A VARIABLE INPUT SPEED AND CONSTANT OUTPUT FREQUENCY AND METHOD OF DRIVING

(71) Applicant: Hamilton Sundstrand Corporation, Charlotte, NC (US)

(72) Inventors: Andrew P. Grosskopf, Rockford, IL (US); Glenn C. Lemmers, Jr., Loves Park, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 235 days.

(21) Appl. No.: 15/986,317

(22) Filed: May 22, 2018

(65) Prior Publication Data
US 2018/0266532 A1    Sep. 20, 2018

Related U.S. Application Data

(62) Division of application No. 13/457,002, filed on Apr. 26, 2012, now Pat. No. 9,989,138.

(51) Int. Cl.
*F16H 47/04*  (2006.01)
*H02K 7/10*   (2006.01)
*H02K 7/116*  (2006.01)
*F16H 37/08*  (2006.01)

(52) U.S. Cl.
CPC .............. *F16H 47/04* (2013.01); *H02K 7/10* (2013.01); *H02K 7/116* (2013.01); *F16H 2037/088* (2013.01); *H02K 2213/09* (2013.01)

(58) Field of Classification Search
None
See application file for complete search history.

(56) References Cited

U.S. PATENT DOCUMENTS

| | | | |
|---|---|---|---|
| 2,946,194 A | 7/1960 | Westbury et al. | |
| 3,023,638 A | 3/1962 | Westbury et al. | |
| 3,735,646 A | 5/1973 | Oberts | |
| 3,969,957 A | 7/1976 | Delalio | |
| 4,373,408 A | 2/1983 | Mills | |
| 4,734,590 A | 3/1988 | Fluegel | |
| 4,774,855 A | 10/1988 | Murrell et al. | |
| 4,825,330 A | 4/1989 | Walchle | |

(Continued)

FOREIGN PATENT DOCUMENTS

| | | |
|---|---|---|
| EP | 1479943 A1 | 11/2004 |
| WO | 8707785 | 12/1987 |

OTHER PUBLICATIONS

Search Report regarding related EP App. No. 13165271.1; dated Jun. 1, 2017; 7 pgs.

*Primary Examiner* — Colby M Hansen
(74) *Attorney, Agent, or Firm* — Cantor Colburn LLP

(57) ABSTRACT

A method of driving an integrated drive generator is provided. The method includes driving a carrier shaft of an epicyclic differential and a variable component of a hydraulic trimming device that is operably coupled to a sun gear of the epicyclic differential. The method also includes driving a generator with an output ring gear that is maintained at a constant output frequency. The method further includes maintaining the constant output frequency by controllably manipulating the speed of the sun gear that is in operable communication with the output ring gear.

8 Claims, 4 Drawing Sheets

(56) References Cited

U.S. PATENT DOCUMENTS

| | | | |
|---|---|---|---|
| 5,581,168 A | | 12/1996 | Rozman et al. |
| 5,684,686 A | | 11/1997 | Reddy |
| 6,139,458 A | * | 10/2000 | Simmons ................ F16H 47/04 475/80 |
| 6,533,695 B2 | | 3/2003 | Pollman et al. |
| 6,561,940 B2 | * | 5/2003 | Goi ...................... F16H 37/086 322/40 |
| 6,663,525 B1 | * | 12/2003 | McKee .................. F16H 47/04 475/72 |
| 7,297,084 B2 | | 11/2007 | Kimura et al. |
| 7,538,990 B2 | | 5/2009 | Belisle et al. |
| 8,206,262 B2 | * | 6/2012 | Hehenberger ............ F03D 7/02 477/37 |
| 2005/0276082 A1 | | 12/2005 | Panda et al. |
| 2008/0155974 A1 | | 7/2008 | Aizetmueller et al. |
| 2009/0103216 A1 | | 4/2009 | Oldenburg et al. |

* cited by examiner

INTEGRATED DRIVE GENERATOR HAVING A VARIABLE INPUT SPEED AND CONSTANT OUTPUT FREQUENCY AND METHOD OF DRIVING

CROSS-REFERENCE TO RELATED APPLICATIONS

This application is a divisional application of, and claims priority to, U.S. patent application Ser. No. 13/457,002, filed Apr. 26, 2012, which is incorporated herein by reference in its entirety.

BACKGROUND

Exemplary embodiments disclosed herein pertain to the art of an integrated drive generator and, more particularly, to driving the integrated drive generator at a constant output frequency with a variable input speed.

Typically, integrated drive generators comprise a generator, a differential and a hydraulic speed trimming device, with each component requiring at least one major centerline for packaging. The generator and the differential each require one centerline, while the hydraulic trimming device requires from one to three centerlines. Providing each component with at least one centerline poses packaging issues for applications offering a restricted amount of space, such as an aircraft, for example. Additionally, such a configuration leads to undesirable weight and overhang moments for the overall integrated drive generator assembly.

BRIEF DESCRIPTION

Disclosed is a method of driving an integrated drive generator is provided. The method includes driving a carrier shaft of an epicyclic differential and a variable component of a hydraulic speed trimming device that is operably coupled to a sun gear of the epicyclic differential. Also included is driving a generator with an output ring gear that is maintained at a constant output speed. Further included is maintaining the constant output frequency by controllably manipulating the speed of the sun gear that is in operable communication with the output ring gear.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
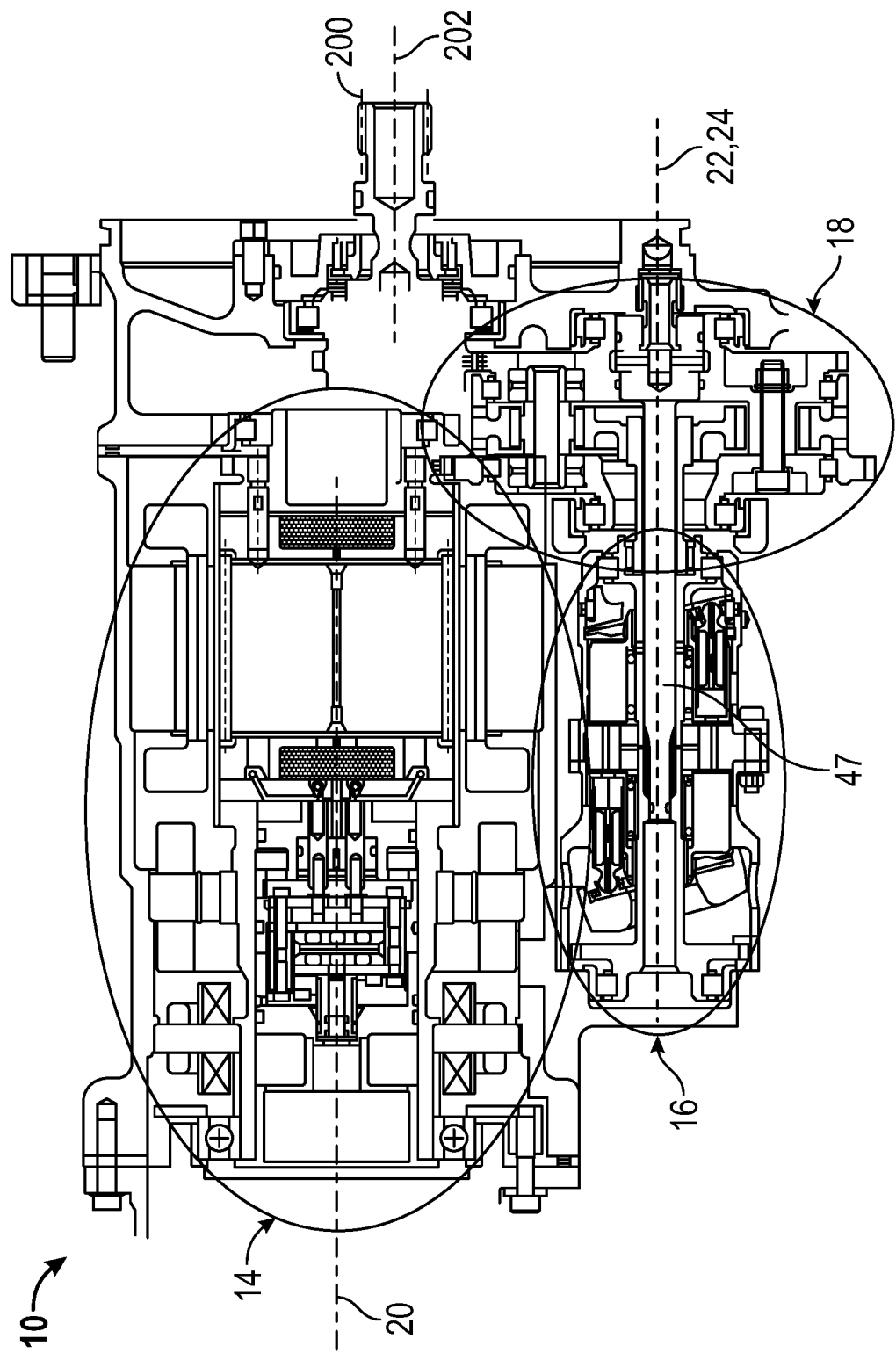
FIG. 1 is a cross-sectional view of an integrated drive generator.
Figure 2:
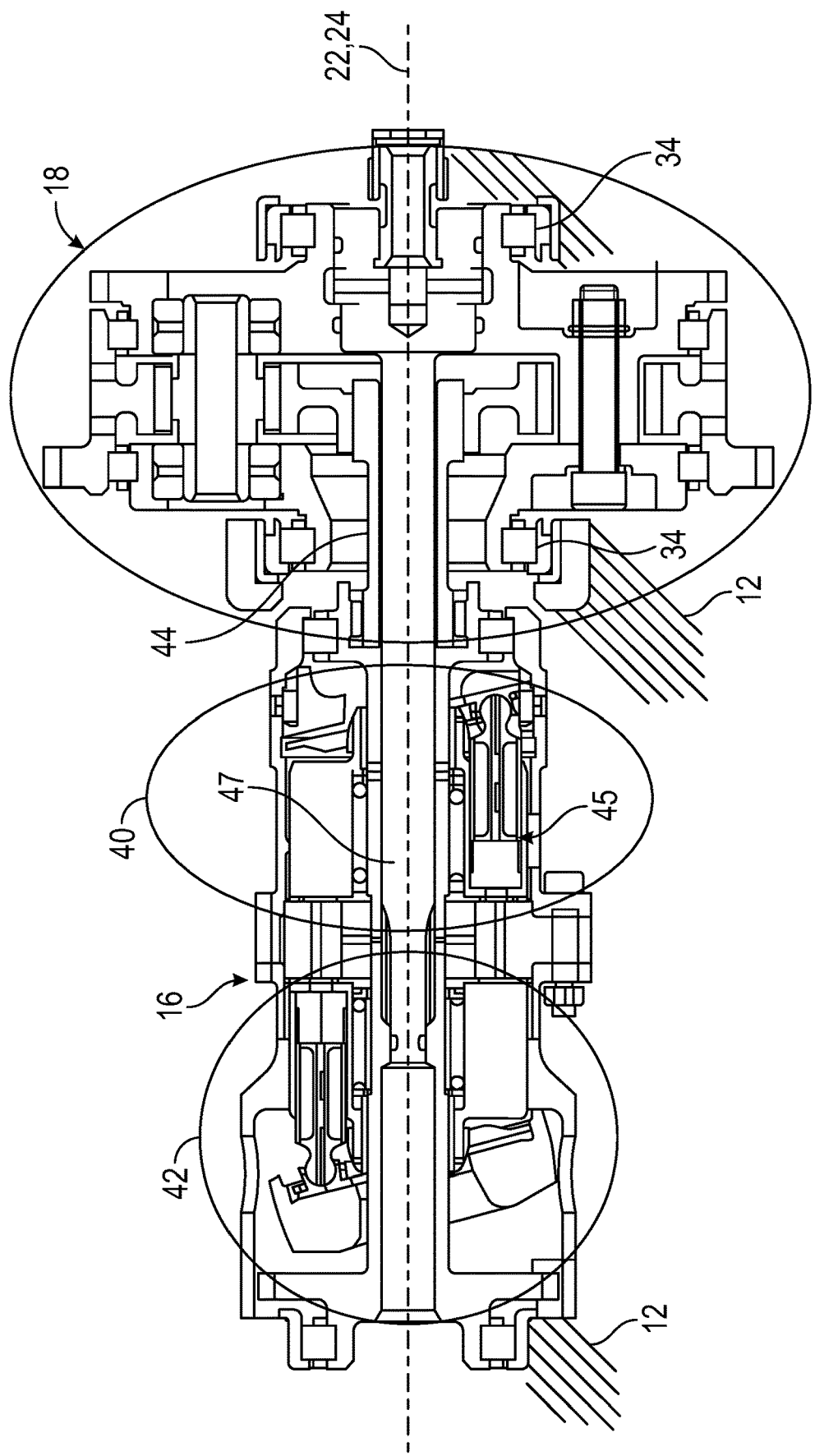
FIG. 2 is a cross-sectional view of a hydraulic trimming device and an epicyclic differential of the integrated drive generator.

Referring to FIGS. 1 and 2, an integrated drive generator (IDG) is illustrated and generally referred to with numeral 10. The IDG 10 may be used in a variety of applications, with one such application being an aircraft, for example. The IDG 10 is configured to receive rotational energy on the input shaft 200 at varying rotational (e.g., input) speeds from a prime mover (not illustrated) and produce output electricity with a constant frequency. The IDG 10 comprises three major components disposed within a housing 12. Specifically, IDG 10 includes: a generator 14, a hydraulic speed trimming device 16 and an epicyclic differential 18 are disposed within the housing 12.

The generator 14 produces an electrical output having a constant output frequency, such as 3-phase 115 VAC at 400 Hz. In order to produce the output with a constant frequency, the generator 14 spins at a constant speed. The hydraulic speed trimming device 16 is disposed proximate to the generator 14 and hydro-mechanically regulates the speed of rotational energy provided to the generator 14. In particular, regardless of variations in the rotation speed of prime mover, the hydraulic speed trimming device 16 is configured to provide rotational energy that adds or subtracts speed through the epicyclic differential 18 to the input shaft 200 so that the generator 14 speed is constant. In one embodiment, the hydraulic speed trimming device 16 comprises a variable displacement side and a fixed displacement side axial piston pump and motor combination. The variable side is driven by a shaft 47 that is coupled to a carrier shaft 28 of the epicyclic differential 18.

The epicyclic differential 18 is operably coupled to the hydraulic speed trimming device 16 and forms a gear relationship with the generator 14 and the input shaft 200, as described in detail below. Each of the generator 14, the hydraulic speed trimming device 16 and the epicyclic differential 18 include, and are disposed about, a first centerline 20, a second centerline 22 and a third centerline 24, respectively. The input shaft 200 in this illustration is on another centerline 202. However, the input shaft 200 could also be packaged on various other centerlines in alternative embodiments. In the illustrated embodiment, the third centerline 24 of the epicyclic differential 18 corresponds to the second centerline 22 of the hydraulic speed trimming device 16, such that the epicyclic differential 18 and the hydraulic speed trimming device 16 are relatively co-axially aligned. Although illustrated and described in the aforementioned configuration, it is contemplated that the third centerline 24 corresponds to the first centerline 20, such that the epicyclic differential 18 and the generator 14 are relatively co-axially aligned. The precise configuration will be dictated by the packaging constraints imposed by the specific application in which the IDG 10 is employed and it is to be appreciated that the configurations described above provide packaging flexibility and the ability to more compactly arrange the components of the IDG 10.

Figure 3:
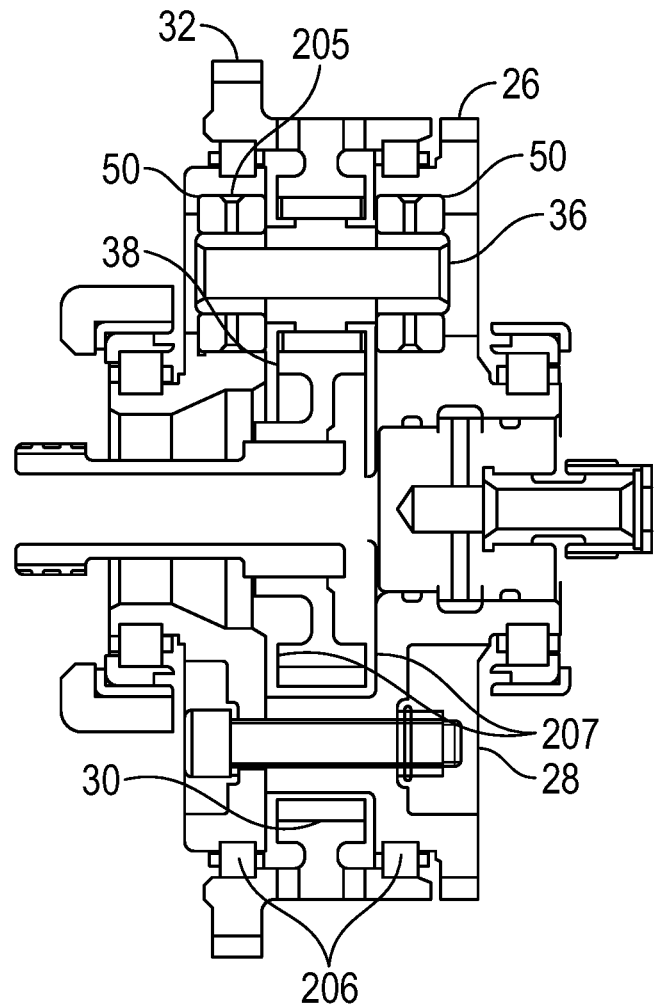
FIG. 3 is a cross-sectional view of the epicyclic differential.

Referring now to FIGS. 2 and 3, the epicyclic differential 18 includes an input gear 26 that is coupled to an output shaft of the prime mover. This could be accomplished by using an input shaft 200 to the input gear 26. The input gear 26 transmits power to drive the carrier shaft 28 of the epicyclic differential 18, with the carrier shaft 28 driving a ring gear 30. The carrier shaft 28 is also coupled to the variable side of the hydraulic speed trimming device 16 by the shaft 47 or other type of coupling. The epicyclic differential 18 is disposed on bearings 34 within the housing 12 and is mounted therein. Additionally, the epicyclic differential 18 includes at least three planet gears 36 and a sun gear 38 that work in conjunction with the hydraulic speed trimming device 16 to maintain the constant output speed of the ring gear 30, and consequently the constant output frequency of the generator 14. The three planet gears 36 mesh with the ring gear 30, as well as the sun gear 38 The planet gears 36 are supported by carbon journal bearings 50. The carbon journal bearings 50 allow for low or zero speed operation of the planet gears 36 while they are loaded, as well as high speed operation. The carbon journal bearings 50 require minimal oil for cooling and lubrication. Lubrication is provided by passages 205 that are supplied by passages in the carrier shaft 28. The bores of the journal bearings 50 are match machined (line bored) to the carrier shaft 28. This provides accurate location and perpendicularity for the planet gears 36 which in turn locate the sun gear 38. If the planet gears 36 were not accurately located, the sun gear 38 could have excessive movement or float and would have excessive wear that could lead to premature failure. The carrier shaft bearing races 206 are also match machined. This aids in locating the ring gear 30 so that the planet gears 36 are not caused to shift off location and result in premature wear. The sun gear 38 is axially located within the carrier shaft 28 by thrust washers 207. The thrust washers 207 provide a bearing surface for the sun gear 38 to prevent wear, but also allows some axial movement of the sun gear 38 within the carrier shaft 28. The male splines on the shaft 44 also are crowned. This allows the sun gear 38 to float and not be bound by the shaft 44 or resulting torsional loads when transmitting power.

As described above, the hydraulic speed trimming device 16 is operably coupled to the epicyclic differential 18 and comprises a fixed displacement side 40, as well as a variable displacement side 42. The fixed displacement side 40 is operably coupled to the sun gear 38 of the epicyclic differential 18 via a splined coupling 44, which is connected to a fixed block 45 of the hydraulic trimming device 16, while the variable displacement side 42 is operably coupled to the carrier shaft 28 of the epicyclic differential 18 via a splined shaft 47. The prime mover is thus also operably connected to a variable component of the hydraulic trimming device 16 because the carrier shaft 28 is coupled to the prime mover by the input shaft 200.

In operation, the epicyclic differential 18 operates at various conditions based on the varying input speed generated by the prime mover. Specifically, a "straight through" speed occurs when the speed of the carrier shaft 28 is such that the ring gear 32 is driven at a ring gear speed corresponding to the predetermined speed and capable of driving the generator 14 at the desired output frequency. In such a condition, the hydraulic trimming device 16 fixes the sun gear 38 speed to zero rpm and the input shaft 200 coupled to the generator at a predetermined gear ratio to maintain a desired output frequency. A second condition is described as a "below straight through" speed, where the varying input speed is driving the carrier shaft 28 at a speed such that the ring gear 32 is driven at a ring gear speed lower than the predetermined speed (if the sun gear 38 were held in fixed or non-rotating position) and not capable of driving the generator 14 such that it produces electricity at the constant output frequency. In such a condition, the sun gear 38 must increase in speed to drive the ring gear 30 at the predetermined speed. Speed is added by rotating the sun gear 38 opposite of the rotation of the carrier shaft 28. This is achieved by adding speed to the sun gear 38 via the hydraulic speed trimming device 16, where the variable displacement side 42 of the hydraulic speed trimming device 16 is the pump and the fixed displacement side 40 is the motor. The third condition is described as an "above straight through" speed, where the varying input speed is driving the carrier shaft 28 at a speed such that the ring gear 32 is driven at a ring gear speed greater than the predetermined speed (if the sun gear 38 were held in fixed or non-rotating position) and driving the generator 14 at a frequency greater than the constant output frequency. In such a condition, the sun gear 38 must decrease in speed to drive the ring gear 30 at the predetermined speed. Speed is subtracted by rotating the sun gear 38 in the same direction of rotation as the carrier shaft 28. This is achieved by decreasing the speed of the sun gear 38 and/or switching the direction of rotation of the sun gear 38 (compared to below straight through speed), where the variable displacement side 42 of the hydraulic trimming device 16 is the motor and the fixed displacement side 40 is the pump.

Figure 4:
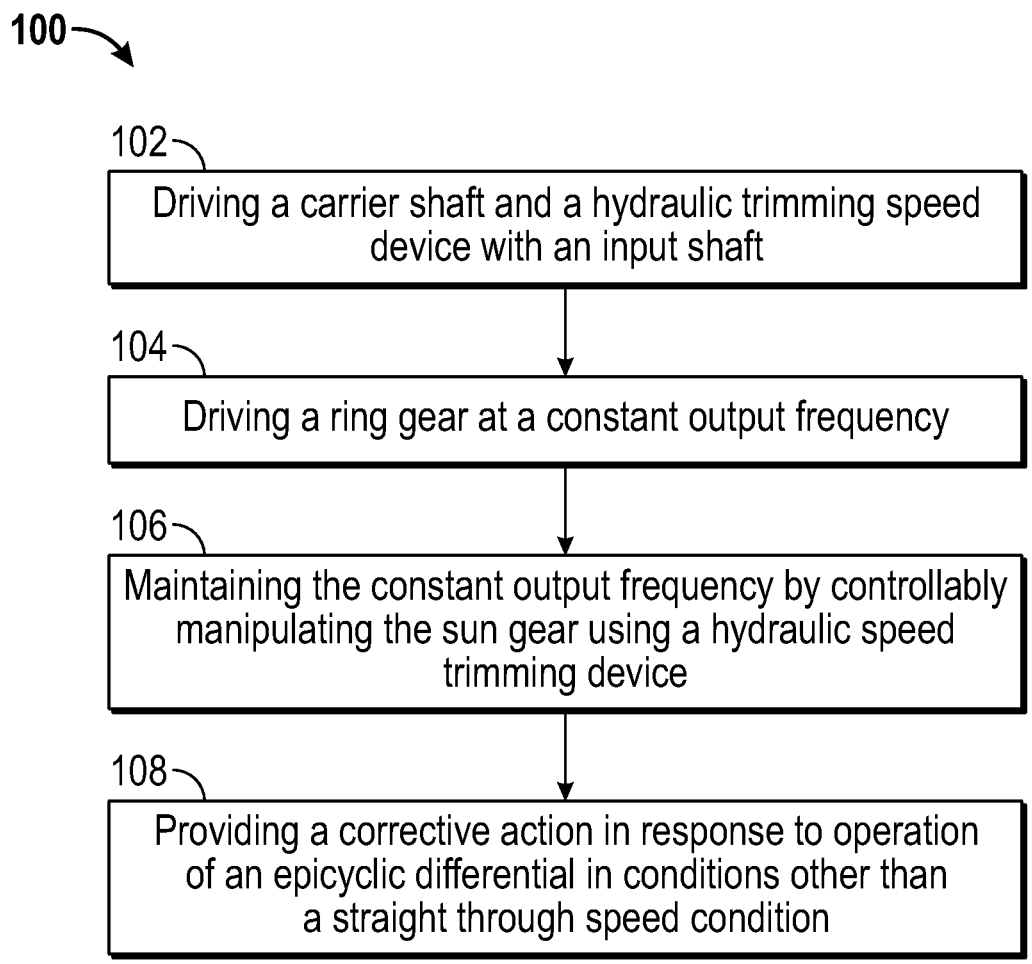
FIG. 4 is a flow diagram illustrating a method of driving the integrated drive generator.

Referring now to FIG. 4, a method of driving 100 the IDG 10 is also provided. The IDG 10 has been previously described and specific structural components need not be described in further detail. The method of driving 100 includes driving a carrier shaft and a variable side of a hydraulic speed trimming device with an input shaft 102. The generator 14 is driven 104 by the ring gear 30 and the fixed side of a hydraulic speed trimming device at a constant output frequency that is to be maintained by controllably manipulating 106 the carrier shaft 28, which is in operable communication with the sun gear 38. Maintaining the constant output frequency is accomplished by providing a corrective action 108 in response to operation of the epicyclic differential 18 input shaft speeds within a desired speed range.

Accordingly, the overall configuration of the IDG 10 provides flexible and compact packaging options by reducing the number of component centerlines, while maintaining robust component interfaces that do not compromise IDG 10 operation.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of driving an integrated drive generator comprising:
   driving a carrier shaft of an epicyclic differential and a variable component of a hydraulic trimming device that is operably coupled to a sun gear of the epicyclic differential;
   driving a generator with an output ring gear that is maintained at a constant output frequency; and
   maintaining the constant output frequency by controllably manipulating the speed of the sun gear that is in operable communication with the output ring gear.

2. The method of claim 1, further comprising driving the carrier shaft of the epicyclic differential with an input shaft of a prime mover and driving the output ring gear with the sun gear.

3. The method of claim 2, wherein the epicyclic differential operates in a first condition, a second condition and a third condition.

4. The method of claim 3, wherein the first condition comprises a straight through speed, wherein the input shaft drives the carrier shaft at a speed capable of driving the output ring gear at a predetermined speed when the sun gear is at zero speed.

5. The method of claim 3, wherein the second condition comprises a below straight through speed, wherein the sun gear drives the planet gears at a ring gear speed equal to the predetermined speed, wherein the sun gear is turning in an opposite direction of the carrier gear.

6. The method of claim 5, further comprising increasing the ring gear speed to the predetermined speed, wherein the hydraulic speed trimming device increases a sun gear speed, wherein the sun gear is turning in the direction of the carrier gear.

7. The method of claim 3, wherein the third condition comprises an above straight through speed, wherein the sun gear drives the planet gears at a resulting ring gear speed equal to the predetermined speed.

8. The method of claim 7, further comprising decreasing the output ring gear speed to the predetermined speed, wherein the hydraulic speed trimming device manipulates the sun gear.

* * * * *